July 29, 1958   E. E. SHELDON   2,845,485
TELEVISION CAMERA FOR EXAMINATION OF INTERNAL STRUCTURES
Filed Nov. 13, 1952   5 Sheets-Sheet 2
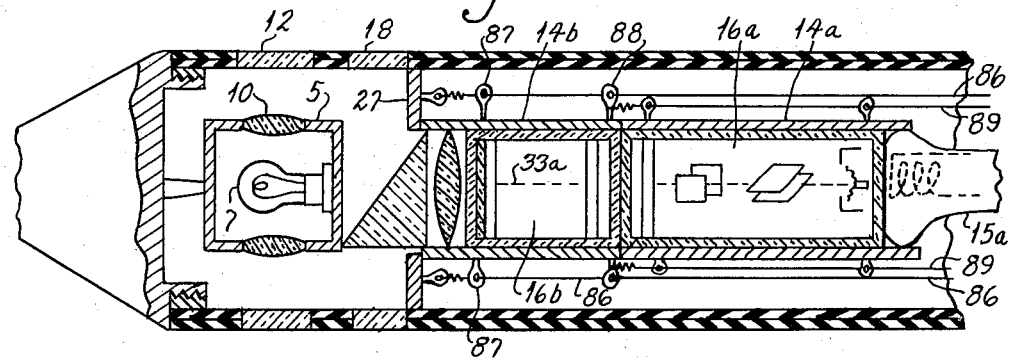
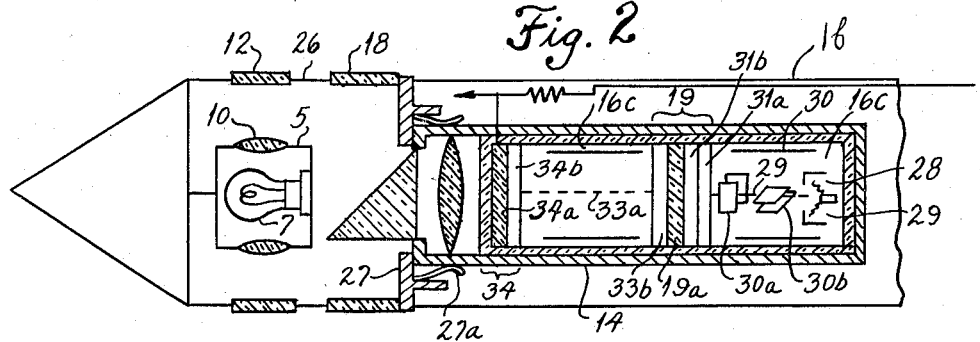
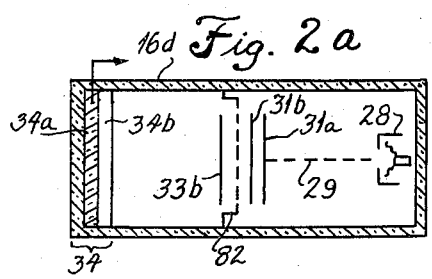
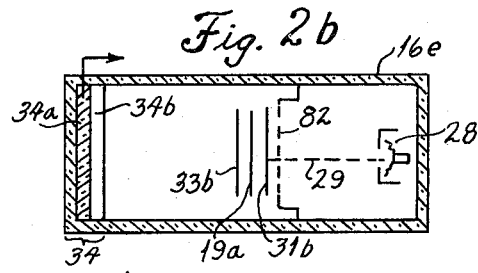
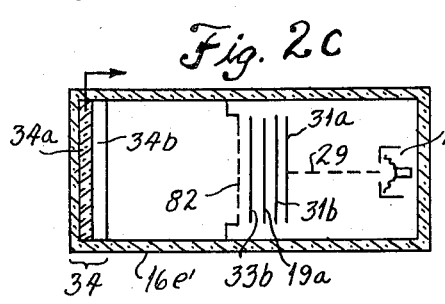
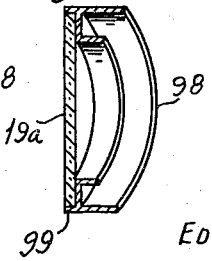
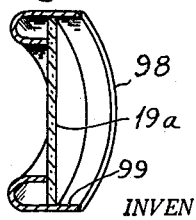
INVENTOR.
EDWARD EMANUEL SHELDON
BY Philip G. Hilbert
HIS ATTORNEY July 29, 1958 E. E. SHELDON 2,845,485
TELEVISION CAMERA FOR EXAMINATION OF INTERNAL STRUCTURES
Filed Nov. 13, 1952 5 Sheets-Sheet 3
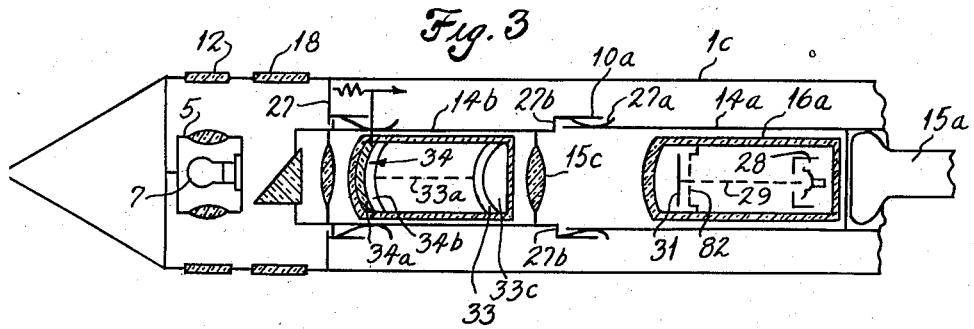
Fig. 3
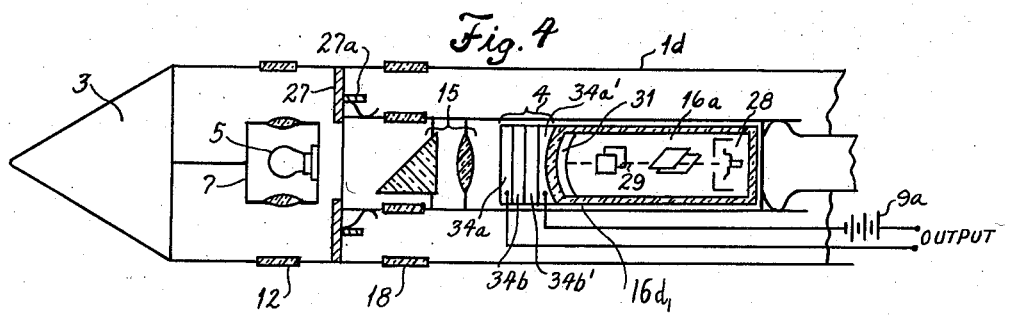
Fig. 4
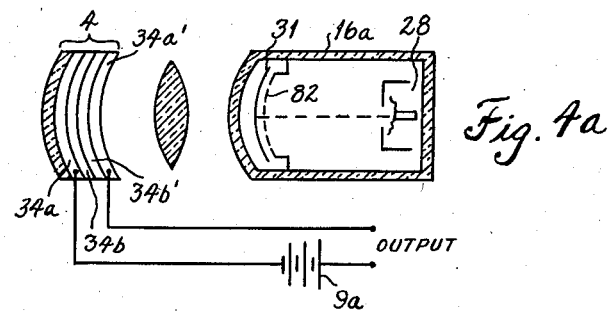
Fig. 4a
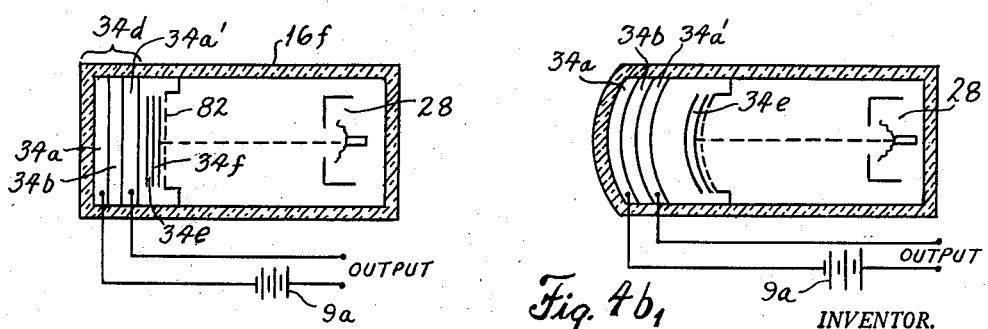
Fig. 4b  Fig. 4b₁
INVENTOR.
EDWARD EMANUEL SHELDON
BY
HIS ATTORNEY July 29, 1958  E. E. SHELDON  2,845,485
TELEVISION CAMERA FOR EXAMINATION OF INTERNAL STRUCTURES
Filed Nov. 13, 1952  5 Sheets-Sheet 4

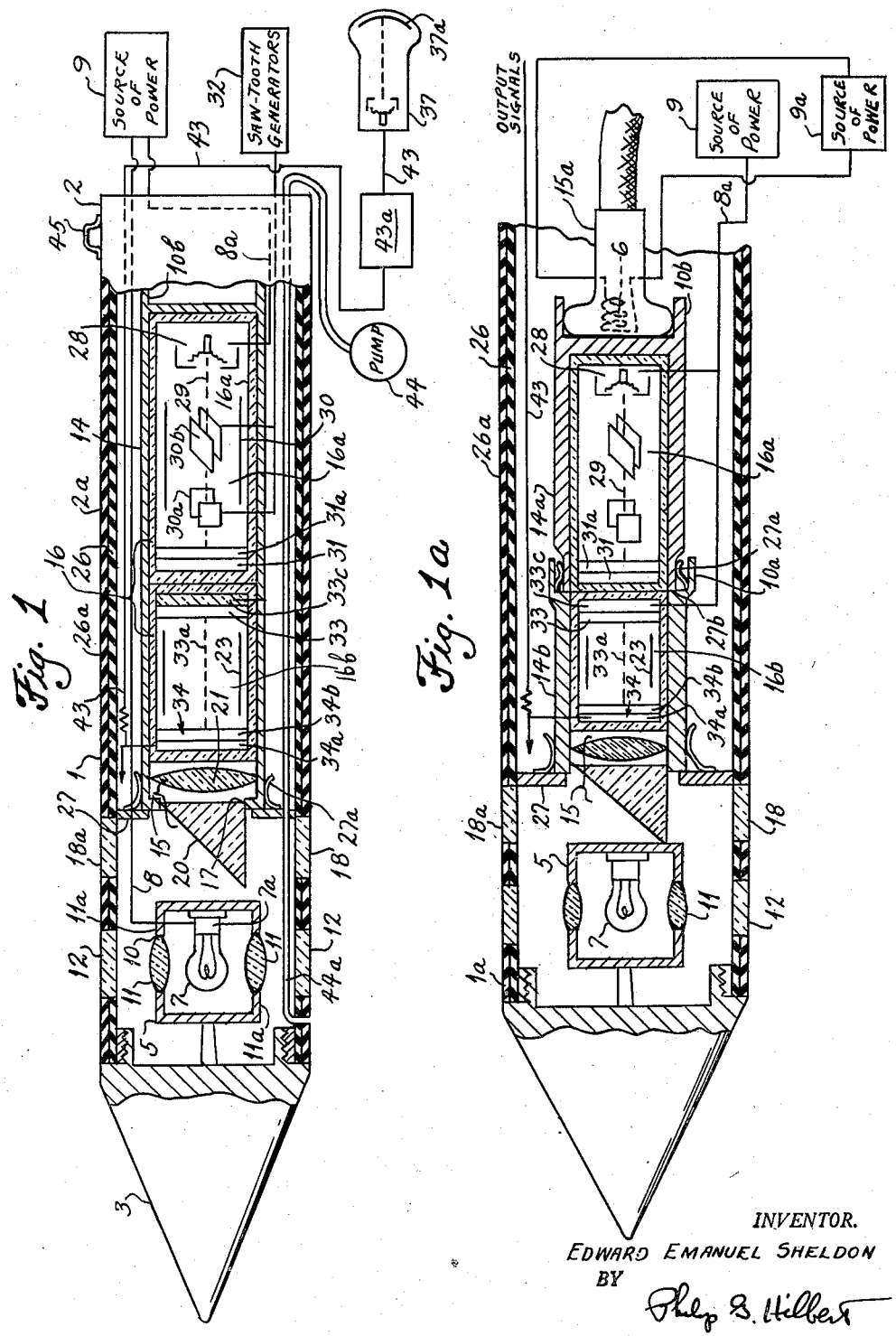

INVENTOR.
EDWARD EMANUEL SHELDON
BY
HIS ATTORNEY

July 29, 1958 E. E. SHELDON 2,845,485
TELEVISION CAMERA FOR EXAMINATION OF INTERNAL STRUCTURES
Filed Nov. 13, 1952
5 Sheets-Sheet 5
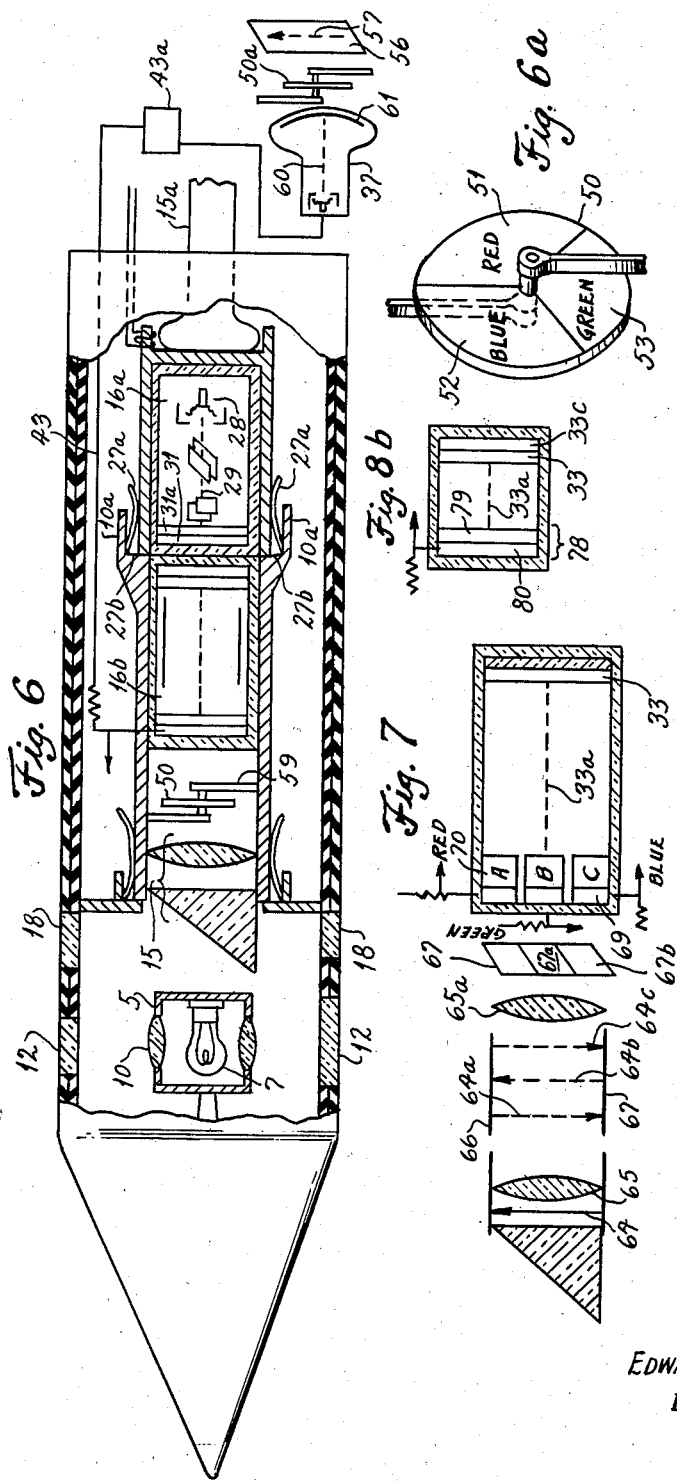
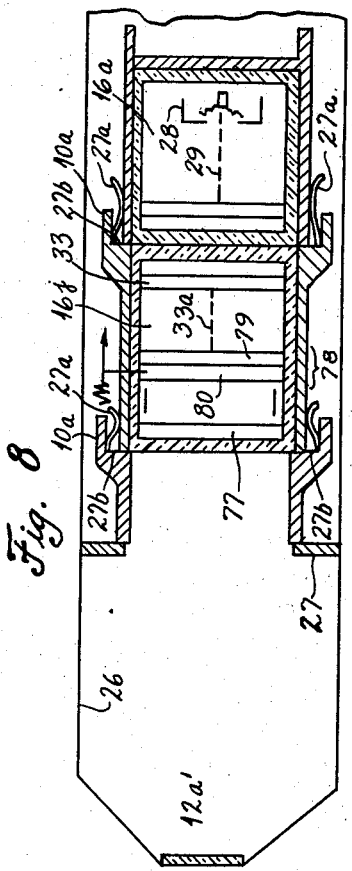
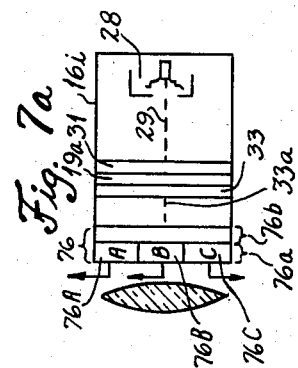
INVENTOR.
EDWARD EMANUEL SHELDON
BY
*Philip G. Hilbert*
HIS ATTORNEY

2,845,485

TELEVISION CAMERA FOR EXAMINATION OF INTERNAL STRUCTURES

Edward Emanuel Sheldon, New York, N. Y.

Application November 13, 1952, Serial No. 320,243

9 Claims. (Cl. 178—6.8)

This invention relates to the novel instrument for examination of the interior of the parts, channels or passages which are inaccessible to the examiner. Due to the inability of light to see around the corners, the present instruments used for such examinations have to be straight and rigid so that the eye of the examiner and the examined part are in one straight line. The instruments using optical lenses or prisms will not help in the situation when the shape and the size of the examined part is variable and unknown in advance. In such a case, the position of the curves and angulations in the examined parts or passages is unknown and therefore the lenses or prisms cannot be positioned to anticipate deviations of the axis of the examined channel from the straight line.

The purpose of this invention is to provide means for inspection of inaccessible channels, such as hollow parts of machinery or of other inaccessible tortuous passages. My device may be introduced inside of a part which cannot be inspected visually without dismantling or destroying the whole machine and will transmit the image of said part to the observer outside of said part. My invention will be especially useful for the examination of coils and pipes or other curved structures. My device can be also used as a probe to be inserted into a solid object and to transmit information about its interior structure.

Another objective of my invention is to intensify the image of the examined internal parts or passages so that the final image will be presented to the observer with the luminosity facilitating inspection of said image.

Another purpose of my invention is to enable simultaneous observation of said inaccessible parts by many examiners, situated in close or remote locations, which was not possible until now.

Another objective of this invention is to change, decrease or amplify the contrast of the image of the examined part.

The objectives of my invention were realized by a novel device which is flexible to allow its introduction into the examined part regardless of its curvatures or angulations and which, after its introduction into the examined part, will produce a light image of said part, will next convert said light image into video signals and will transmit said video signals outside of said part. Video signals are reconverted in receivers outside of the examined part into visible images for inspection or recording. My intrascopic device can produce black and white images, as well as multi-color images showing faithfully or arbitrarily the colors of the examined part.

In particular this novel device makes use of a television pick-up tube consisting of two separate, independent elements which can be introduced separately into the examined part and which, after introduction, work in cooperation as a television camera. As each of these two separate elements is smaller in size than any conventional television camera can be made, this novel television camera can be introduced into locations which, because of small size or tortuous shape of passages leading to them, were inaccessible to the most miniaturized television cameras known in the art.

Another marked improvement in my novel television camera is elimination of magnetic deflecting coils which are bulky and occupy so much space that even a small television tube using them cannot be introduced into narrow passages. The use of conventional electrostatic deflecting system results into a marked distortion of images especially in pick-up tubes using the slow scanning electron beam. These drawbacks are eliminated in my intrascope and therefore in spite of its very small size it is capable of producing images of good definition and contrast.

In the drawings:

Fig. 1 represents a partially sectioned view of the novel instrument for inspection of inaccessible parts;

Fig. 1a shows a modification of intrascope;

Fig. 1b shows the intrascope in combination with the pushing guide for introduction of component parts of the television camera into the intrascope;

Fig. 2 shows the intrascope provided with a modification of the television camera;

Figs. 2a, 2b and 2c represent modifications of the television camera;

Figs. 2d and 2e represent a cross-sectional perspective view of supporting element for the composite target in the television camera;

Fig. 3 shows a modification of the intrascope having an optical system;

Figure 8A:
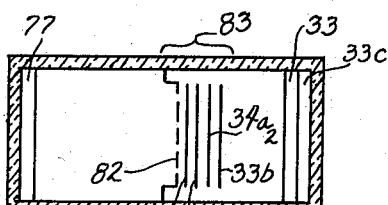
Figure 5:
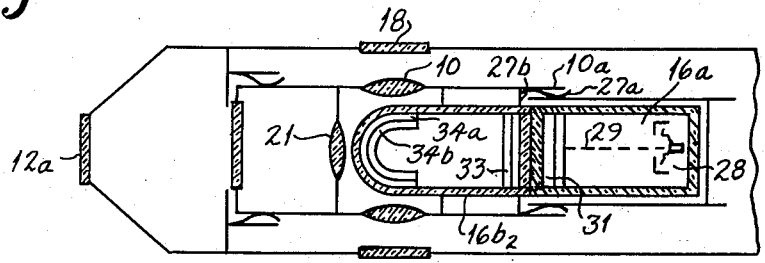
Figure 5A:
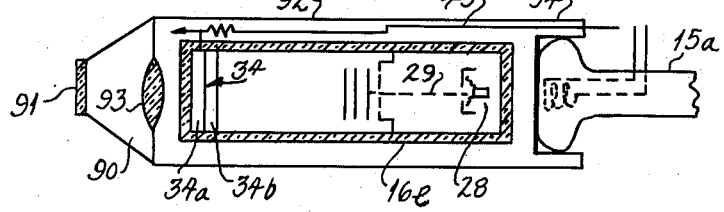

Figs. 4, 4a, 4b, $4b_1$, 4c and 4d and 4e show simplified cameras for the intrascope;

Fig. 5 shows an intrascope without illumination source;

Fig. 5a is a simplified form of intrascope shown in Fig. 5;

Fig. 6 represents an intrascope for producing color images;

Fig. 6a represents color disc;

Fig. 7 represents a modification of the intrascope for color images;

Fig. 7a represents a simplified form of an intrascope pick-up tube for color images;

Fig. 8 represents an intrascope sensitive to invisible images;

Fig. 8a represents a modification of an intrascope pick-up tube sensitive to invisible images; and Fig. 8b represents a modification of the pick-up tube.

The new device which may be called the intrascope 1 is shown in Fig. 1. The handle 2 is a hollow tube of diameter corresponding to the examined part. The handle may be rigid or semi-flexible or completely flexible according to the part to be examined. At the end of the handle begins the flexible part 2a of the intrascope which also has width and length suitable for the size of the examined part. In case the intrascope is used for examination of fragile parts, the part 2a must be very flexible and pliable in order to avoid damage to the wall of the examined part. The basic feature of the material for the flexible part of the intrascope is therefore that it must be easily bent and molded by the walls of the passages in which it is being introduced. Such material may be a suitable plastic or rubber 26, of the type used by Davol Rubber Company of Providence, Rhode Island. In some cases the layer 26 or 26a should be of a highly dielectric material to prevent any short circuits. In case the intrascope is used for investigation of sturdy parts the part 2a may be obviously more rigid. The flexible part 2a of the intrascope may be in such a case made of the stainless steel spiral sheet designed not only for durability but also to maintain the proper degree of flexibility and elasticity. The metal spiral is tapered to insure its uniform bending. The intrascope may be covered with an outer tubing 26a such as for neoprene, preferably of a dielectric having good insulating properties. The tubing 26 prevents dust particles and moisture from affecting the optical and pick-up system located inside of the intrascope. At the end of the flexible part there is a semi-flexible tip 3 which may be screwed on the flexible part and can be easily removed giving thereby access to the inner structures of the intrascope. The tip consists of a rubber conical finger and serves to facilitate the gliding of the intrascope within the examined part. In case the intrascope is used as a probe for insertion into a solid object the tip 3 should be preferably rigid and sharply pointed to be able to pierce wall of the examined object.

In order to facilitate the introduction of the intrascope into parts which have no curves my device can be made semi-rigid by inserting into it a semi-rigid stilet.

In some cases the examined part has to be distended by air or fluid insufflation prior to the examination. A special pump attachment 44 and a channel 44a in the intrascope is provided for this purpose. The channel 44a also may serve to evacuate contents of the examined part before examination to improve visibility. The knob 45 on the proximal end of the intrascope serves to indicate to the examiner the position of windows 12 and 18 of the intrascope.

In the distal end of the flexible part of the intrascope there is a housing box 5 containing the illumination system 7. The box 5 may also be attached to the inner walls of the intrascope by means of the brackets or may be held by springs. It is obvious that there are many means for attachment of the box 5 which are well known in the art. All walls of the housing box 5 except the one facing the television pick-up tube 16 are provided with windows 10 for transmission of the light from the illuminating system 7. These windows are correlated with the windows 12 in the flexible part of the intrascope which transmit the light from the illuminating system to the examined part. In some cases the windows 12 may be made to extend over the circumference of the intrascope. In some cases the window to transmit illumination from the light source to the examined part may also be provided in the distal end of the intrascope instead of being only in its side walls, and in such case the tip should be made of transparent material or may be omitted. Windows 12 may be provided with shutters which can be controlled from the proximal end of the intrascope which is outside of the examined part, and which will protect the windows from being soiled during insertion of intrascope.

The illuminating system may consist of the electrical bulb 7. The electrical bulb may be mounted in the housing box 5 by means of a socket 7a. In some cases it is advantageous to use the objective lens 11 between the light bulb and window 10 in order to concentrate the light on one field. The lens may be held in position by brackets 11a. The light bulb is activated by the source of electrical power 9 situated outside of the examined part. Such a source may be the commercial electrical current or battery of dry cells. The flexible electrical cable 8 leads from the socket 7a to said outside source of electrical current 9. The cable is a lacquered, double insulated electric wire, is covered in addition with liquid rubber and is vulcanized in order to prevent a short circuit. The housing unit 5 may be in some cases omitted and the light source may be attached to the socket 7a which is held by brackets.

In the flexible part 2a proximally to the housing box 5, there is a rigid non-transparent housing compartment 14 containing the optical system 15 and the novel television pick-up tube 16a and 16b. The housing 14 has an opening 17 in which the optical system 15 is lodged and which serves to admit the image of the examined part. This opening is correlated with windows 18 in the flexible part of the intrascope which transmit the image of the examined part. In some cases the windows 18 may be made to extend over all the circumference of the intrascope. The windows 18 may be provided with shutters operated from the proximal end of the intrascope which is externally of the examined part. The housing 14 containing the television pick-up tube 16a and 16b and the optical system may also be attached to the inner wall of the flexible part 2a of the intrascope by means of brackets or may be held by springs 27a. As the housing box fits into the encasing holding member 26 and is held by it tightly, in some cases no supporting means such as springs are necessary.

The optical system 15 may consist of 90° gable prism 20 and of lens 21. The optical system may have its own housing unit instead of being lodged in the compartment 14 and may be then introduced into the intrascope separately.

In some cases it is desirable to have a large field of vision and at the same time to preserve the necessary magnification of the examined part. In such a case instead of the prism 20 a rotating mirror should be used. The mirror has first surface coating which eliminates the reflections and is activated by the magnetic solenoid placed beneath the mirror. The solenoid is connected by the elastic cable with the controls outside of the examined part and can tip the mirror from the retrograde position to the forward position giving thereby an additional field of vision without the necessity of moving the intrascope. The image of the examined part is reflected by the mirror on the objective lens which focuses said image on the photocathode of the novel television pick-up tube 16b described below. In case the magnification of the examined part is not necessary a large field of vision can be obtained by using the lens providing 80° field of vision instead of the usual 45–50°. The image produced by the optical system is inverted but it can be reverted to the original position either by an additional lens or electron-optically in the viewing tube. The rotating mirror may also serve to admit the image either through window 18 or 18a without rotating the whole camera 16.

The housing box 14 contains the novel miniature television camera 16 which was designed to reduce to the minimum the size of the television camera. The television pick-up tubes known previously in the art could be miniaturized only to a certain degree, which was not sufficient in certain applications as some of the examined parts are too small to allow the introduction even of the smallest conventional pick-up tube. This is true especially for the type of tubes having external deflecting coils such as of magnetic or electro-magnetic type, and in such situations, my novel camera 16 will be very suitable as it does not require any external deflecting or focusing coils at all. The camera 16 consists of two vacuum tubes 16a and 16b. The tube 16a has an electron gun 28 which produces an electron beam 29. The electron beam 29 is focused by electrostatic field 30. The electron-optical system for focusing the electron beam 29 may be simplified and markedly reduced in length by using the unipotential electrostatic lens instead of the usual two-lens system. The electron beam 29 is deflected by electrostatic plates 30a and 30b in two perpendicular to each other planes. The electrostatic plates are energized by signals from saw-tooth generators 32 which are situated outside of the examined part. The generators 32 are connected with electrostatic plates 30a and 30b by means of flexible wires. One deflecting field is produced by the horizontal deflection plates 30a and may have line frequency such as 5–15,000 cycles per second. Another deflecting field is provided by the vertical deflection plates 30b and may have field frequency such as 15–60 cycles per second. In this way the electron beam 29 is made to scan the fluorescent screen 31 in a regular television raster. The fluorescent screen 31 may be in some cases provided with electron transparent conducting backing layer 31a such as of aluminum. The fluorescent screen 31 must be of a phosphor of a very short persistence in order to obtain a good resolution of the image. ZnO has decay time of 1 microsecond and is suitable for this purpose. Still better results may be obtained by means of ZnS phosphor and using only ultraviolet component of its fluorescent emission which has decay time of $1/10$ microsecond. In some cases, it is preferable to make the fluorescent screen 31 of semispherical curved shape as it will improve definition of the flying light spot.

The vacuum tube 16a operates in combination with the vacuum tube 16b forming together the novel television camera 16. The vacuum tube 16b has a photoemissive electrode 33 which may be deposited or attached to one of the walls of said vacuum tube. In some cases it is preferable to provide a light transparent conducting layer 33c such as of material known in the trade as "Nesa," or of compounds of tin or of cadmium, on the side of said photoconductive electrode 33 facing the fluorescent screen 31. Such a layer must be very thin, e. g., of the order of microns in order not to impair the definition of images produced by the novel pick-up tube. The photoemissive electrode 33 may be of CsOAg or of caesium, lithium or rubidium on antimony, arsenic or bismuth. At the opposite end of the vacuum tube 16b there is provided photocathode 34 which consists of a light transparent conducting signal plate 34a and of a photoconductive or photovoltaic layer 34b. In some cases the photoconductive layer 34b may be, instead of a mosaic, preferably of continuous type.

The satisfactory photoconductive materials are selenium, $Cu_2O$, germanium, silicon, thallium sulphide, antimony or cadmium sulphide and lead sulphide or selenide. Many sulphides, selenides and oxides exhibit strong photoconductive effect or photovoltaic effect and can be used for this purpose. The layer 34b will operate by photoconductive effect if it is subject to an electric field which may be provided by connecting one lead from the external source of electrical power 9 to the conducting layer 34a and another lead to the conducting coating on the wall of vacuum tube 16b. The same layer 34b may operate by photovoltaic effect if it is not subject to an electrical field. In such a case the photovoltaic layer when irradiated by the image forming radiation will respond by producing its own E. M. F. The light transparent conducting layer 34a serves as a signal plate. It can be made of a very thin light transparent layer of a conductive metal such as Ag, Au or Pt or of any other transparent and conductive material, e. g. as were described above. The image of the examined part is focused on the photocathode 34 and produces changes in its conductivity according to the pattern of the image of the examined part. The photocathode is scanned by electron beam 33a from the photoemissive electrode 33.

Both vacuum tubes 16a and 16b are held in apposition to each other and in such a manner that the fluorescent screen 31 of the vacuum tube 16a is adjacent to the photoemissive electrode 33 of the tube 16b. The scanning electron beam 29 impinging on the fluorescent screen 31 produces a light spot at each point of its impingement. The scanning illumination excites the photoemissive electrode 33 and produces thereby a fine scanning beam of photoelectrons 33a. The photoelectron beam 33a is of the scanning type because it is produced by the scanning electron beam 29. The photoelectron beam 33a may be further focused by electrostatic fields 23. In this construction it is preferable to use focusing fields because the separation of the fluorescent screen 31 from the photoemissive electrode 33 by the thickness of the wall of the vacuum tubes 16a and 16b causes certain unsharpness of the photoelectron beam 33. In cases in which electrostatic focusing field 23 is used to focus the scanning electron beam 33a on the photocathode 34, much better resolution will be obtained by making said photoconductive layer 34b of a curved semispherical shape. In addition, the use of such spherically shaped photocathode will eliminate instability of the image which is very marked when using electrostatic fields for focusing a slow electron beam.

The scanning electron beam 33a may be of a high velocity such as used in the iconoscope or of a low velocity. A low velocity scanning beam 33a is preferably used in this embodiment of the invention. The scanning beam 33a striking the photoconductive layer 34b deposits electrons thereon and charges it to the potential of the electrode 33. The signal plate 34a is charged positively from an extraneous source of electrical power 9. The resistance of the photoconductive layer 34b is great enough to prevent passage of charges from its scanned side to the positive signal plate 34a. If however the photoconductive layer 34b is illuminated its resistance decreases proportionally to the intensity of the incident light and the time of illumination. This makes possible the flow of charges through the photoconductive layer 34b and the scanned side of said layer becomes between successive scans 1-2 volts positive in relation to the potential of the electrode 33. During the next scan the electron beam 33a neutralizes this positive charge on the photoconductive layer and produces thereby a video signal which flows through the signal plate layer 34a over resistance to the amplifiers 43a. In some cases an additional mesh screen is preferably disposed in close spacing to the free surface of the photoconductive layer 34b and serves to improve electrical field in front of said layer 34b.

Video signals from the tube 16b are transmitted by the flexible coaxial cable 43 from the intrascope within the examined part to the video amplifiers 43a outside of said part. The amplified signals are transmitted from the amplifiers to the viewing tube of kinescope type 37 and are reconstructed therein into the visible image representing the image of the examined part. The viewing tube may be of kinescope type and does not have to be described in detail as it is well known in the art. The examined part will appear on the fluorescent screen 37a of the viewing tube where it can be inspected by many examiners. Transmission of the image from the amplifier 43a to the viewing tube can be done by coaxial cable 43 or by high frequency waves. The image can be sent therefore not only to the immediate, but also to the remote receivers or may be transmitted by multiple independent viewing tubes for the benefit of many examiners which was one of the objectives of this invention. The image on the viewing tube 37 may also be photographed simultaneously with the intrascopic examination in order to make a permanent record which was another purpose of this invention.

The coaxial cable 43 within the examined part may be encased in the above described means 26 or 26a for inserting my intrascope or may be attached to them. In some applications the coaxial cable may be outside of said inserting means being attached only to the pick-up tube.

The contrast of the reproduced image may be changed, diminished or increased according to the needs of particular examination by using amplifiers provided with variable mu tubes, or by the use of kinescope in which gamma can be controlled. The signal to noise ratio of this system and therefore the definition of the reproduced image may be improved by using in amplifiers discriminating circuits which reject signals below the predetermined amplitude and eliminate therefore most of the noise signals.

The voltages for the operation of the tubes 16a and 16b are supplied through the flexible elastical wires 8a from the source of the electrical power 9 outside of the examined part. In the same way the horizontal and vertical synchronizing circuits, focusing fields and deflecting circuits are supplied with electrical energy from the outside source of power 9. The synchronizing and deflecting circuits and focusing fields are not described in detail as they are well known in the art and it is believed they would only complicate the drawings.

The housing 14 containing the television camera can be rotated in its position in the intrascope, so that the optical system 15 can be made to face the window 18 or 18a and to "see" thereby various areas of the circumference of the examined part. The rotation of the camera can be accomplished by means of a pusher 15a which fits into extensions 10b of the box 14. The rotation of the camera may be preferable in some cases to the rotation of the whole intrascope which allows to accomplish the same purpose. In some cases the intrascope may be used not for the reproducing of whole images but for transmitting signals from the interior of the examined part, which signals represent and provide the desired information.

The main rigid portion of the flexible intrascope is the television camera 16. Therefore the shorter the television camera is, the easier it will be for the intrascope to pass through sharply angulated or curved passages. One of the advantages of the novel pick-up tube 16 is that it makes it possible to break up the smallest pick-up tube into two component parts such as tubes 16a and 16b and introduce each of said tubes into the examined part separately, reducing thereby considerably the rigid portion of the intrascope which is due to the television camera, as shown in Fig. 1a.

To accomplish these objectives the flexible intrascope 1a is introduced first into the examined part while containing only the box 5 housing the light source 7. Inside of the intrascope 1a, proximally to the box 5 there is a ring-like partition which serves as a stop 27 for the pick-up tube 16b which is to be introduced later. It is obvious that the shape of this stop may vary. The rest of the intrascope 1a is empty. The intrascope 1a is introduced first into the examined part. As the only rigid part in the intrascope is now the box 5 which is very small, this intrascope can easily pass even through very narrow and curved passages. After the intrascope 1a has been introduced into the examined part for a desired distance which can be read easily on the markings provided on the outside wall of the intrascope, the next step begins. Now the housing box 14b in which the vacuum pick-up tube 16b is mounted is introduced into the intrascope. The housing box 14b is pushed into the intrascope until it reaches the stop 27, which can be also ascertained by the X-ray control. The box 14b may be held in position by spring extensions 27a on said stop 27. The housing box 14b may be pushed into its position by a flexible elastic guide 15a which is fitted into the proximal end of the housing box 14b. For this purpose the housing box 14b is provided with a ring-like extension 10a at its base as shown in Fig. 1a, which has spring-like property or is provided with springs 27a. The head of the flexible pusher 15a fits into this extension and is kept in position by it. The flexible pusher 15a may also be provided with electrical coils 6 at its distal end which is adjacent to the element to be introduced into the intrascope. The coils 6 are connected to the source of electrical power situated outside of the examined part. In this way, the head of the pusher may be given electromagnetic properties by closing the circuit, energizing said coils 6. The pusher 15a will be held therefore in the elements to be introduced into the intrascope, such as boxes 14a, 14b or the optical system 15, not only by the mechanical pressure of the extension 10a but by magnetic attraction as well. When the pusher 15a is to be withdrawn, the current supplying the coils 6 is shut off. To facilitate the guiding of the box 14b into the intrascope, a set of threads 86 may be used which are at one end attached to the stop 27, and which are threaded through the perforations in the extensions 87 of the housing box 14b. After the box 14b has been introduced into its proper position the intrascope, the pusher 15a is removed. Another set of threads 89 is attached to the extensions 88 in the housing unit 14b and serves to pull out said box 14b to the exterior of the examined part when the examination is finished. This arrangement is shown in Fig. 1b.

The housing box may be omitted in some cases and the tube 16b may be introduced into the intrascope without any housing and will be held in position by the same means as described above for holding the box 14b.

After the box 14b with the tube 16b has been introduced, the box 14a housing the tube 16a is introduced now into the intrascope in a similar manner as was described above. Both boxes 14b and 14a have openings at their proximal and distal ends respectively, which makes it possible to bring the fluorescent screen 31 of the tube 16a in close apposition to the photoemissive electrode 33 in the tube 16b. The boxes 14a and 14b are provided with mechanical means for securing a good contact of the proximal end of the tube 16b with the distal end of the tube 16a. One way of providing such a contact is to make the compartment 14a fit inside of the spring like extension 10a at the proximal end of the compartment 14b. The housing box 14a contains vacuum tube 16a which has been described above. The housing box 14a is provided with spring-like extensions 10b which serve to accommodate the head of the pushing guide 15a.

The housing box 14a is pushed into the intrascope until it reaches the position of the stop 27b. This can be also checked by the X-ray control. The stop 27b is so situated that when the housing box 14a reaches it the tubes 16b and 16a will be in apposition to each other. In some cases flexible coils which can be converted into magnets by passing through them an alternating current from an outside source of electrical power may be provided on the stops 27 and 27b or at extensions 10a of the intrascope to help the positioning of boxes 14a and 14b. In this way the rigid portion of the intrascope which has to pass through a narrow passage or acute curvature is now only a fraction of the rigid part of intrascopes which use even the smallest pick-up tube of conventional type. This represents an important improvement as it makes it possible to introduce the intrascope into parts which were not accessible previously to examination. In case the size of the pick-up tube is not of critical importance I may use for my intrascope one of standard television tubes after a suitable miniaturization.

The size of the kinescope tube 16a may be reduced considerably if it can be operated at a low voltage and produce at said low voltage sufficient illumination of the electrode 33. One way of accomplishing this purpose is disclosed in my U. S. Patent No. 2,586,391 which discloses amplifying screen consisting of a light reflecting layer, a fluorescent layer, a light transparent separating layer and a photoemissive layer. Said screen is disposed in the kinescope between the electron gun and the fluorescent image reproducing screen. The same objective may be also obtained by using between the electron gun and the image reproducing screen a secondary electron emissive electrode which may be of a solid type or preferably of mesh screen structure. The mesh screen is of material having a high secondary electron emission ratio such as Ag:Mg or it may have deposited on a mesh screen a layer of a highly electron-emissive material such as of CsO or of CsSb. As 6–10 electrons may be emitted by said screen for each incident electron, the voltage of the kinescope may be considerably reduced. The electron-optical field between said secondary electron-emissive electrode and the fluorescent screen 31 will focus the divergent secondary electrons into fine beams so that the definition of the image will not be markedly impaired.

There are certain drawbacks in the intrascope 1 or 1a described above. The separation of the fluorescent screen 31 from the photoemissive electrode 33 by the thickness of the wall of the vacuum tube 16a and of the tube 16b causes some unsharpness of the photoelectron beam 33a.

This unsharpness is due to diffusion of light spot from fluorescent screen 31 as it travels through distance equal to the thickness of the walls of the tubes 16a and 16b. By the time the light spot reaches the photoemissive electrode 33 it has spread so that it can not produce any more a fine photoelectron beam. Besides the fluorescent light spot suffers in the glass walls of the tube 16a and 16b multiple internal reflections so that part of the fluorescent light will be scattered and will strike different separated areas of the electrode 33 reducing thereby further definition and contrast. Furthermore it is not always possible to introduce component parts of intrascope separately as was described before. In some examinations the time available is very limited so that intrascope must be ready for the use as soon as possible. In such cases another modification of my invention is more suitable. This embodiment 1b of the intrascope is shown in Fig. 2. In this embodiment of invention the tubes 16a and 16b are replaced by one vacuum tube 16c having a composite target 19 described below. The fluorescent layer 31b is of phosphors described above and is deposited on one side of a very thin light transparent separating partition 19a whereas the photoemissive layer 33b of one of the materials described above is deposited on the opposite side of said partition. The partition 19a may be of mica, glass, or of a suitable plastic and should be preferably very thin such as of the order of a fraction of millimeter in order not to impair definition of images produced by the said television pick-up tube. Better results may be obtained if the partition 19a is conductive. This may be accomplished by using for the partition a conductive material or by coating the partition on the side which supports the photoemissive layer with a light transparent conducting layer such as is known in the trade under the name of "Nesa," or with light transparent conducting layer of tin or of cadmium or indium compounds. In some cases the composite target 19 may be deposited on the photocathode 34 instead of being supported by the side walls of said pick-up tube. In this event the separating layer 19a may be preferably reduced to the thickness of a fraction of one micron.

The partition 19a may be placed in its position within the tube 16c by means of a metallic ring 98 having a flange 99 which supports the partition, whereas the ring itself is attached to the walls of the tube. The cross-sectional perspective view of the ring 98 and partition 19a is shown in Figs. 2d and 2e. Instead of a metallic ring 98 the transparent separating layer 19a, the fluorescent layer 31b and photoemissive layer 33b may also be supported by the mesh screen of conducting or insulating material 82 as shown in the pick-up tube 16d and 16e illustrated in Fig. 2a, Figs. 2b and 2c. In modifications shown in Figs. 2b and 2a, instead of a mesh screen a supporting layer of continuous type may be used also and may be made of one of the materials used for the separating layer 19a which should be either light transparent or electron transparent according to the location of said separating layer. In some cases it is preferable to make the fluorescent layer 31b and the photoemissive layer 33b of semi-spherical curved shape. In some cases, the separating partition 19a may be omitted and the fluorescent layer 31b and photoemissive electrode 33b are both supported by the mesh screen 82 or by supporting element of continuous type without any separating layer. This arrangement is possible only in cases in which the photoemissive layer 33b and fluorescent layer 31b do not inactivate each other and the photoemissive layer 33b is conductive. The other elements of the novel pick-up tubes 16c, 16d and 16e are the same as described above. At one end of the tube 16c there is disposed an electron gun 28 which produces an electron beam 29. The electron beam 29 is focused by electrostatic field 30 and is deflected by electrostatic plates 30a and 30b in two perpendicular to each other planes. The electrostatic plates are energized by signals from saw-tooth generators 32 which are situated outside of the examined part. The generators 32 are connected with electrostatic plates 30a and 30b by means of flexible wires. In this way, the electron beam 29 is made to scan the fluorescent layer 31b of the composite target 19 in a regular television raster. The fluorescent layer 31b may also be provided with an electron transparent metallic conducting backing layer 31a such as of aluminum. The fluorescent scanning light spot produces a scanning photoelectron beam from the photoemissive layer 33b which may be CsOAg or of caesium, lithium or rubidium on antimony, arsenic or bismuth. At the opposite end of the vacuum tube 16c there is provided photocathode 34 which consists of a light transparent signal plate 34a and of a photoconductive or photovoltaic layer 34b. The layer 34b may be of continuous or of mosaic type. Suitable materials for layer 34a and 34b were described above.

In some cases it is preferable to focus the scanning electron beam 33a on the photocathode 34. The focusing has to be done by means of electrostatic fields 23. In such event the photocathode 34 or its photoconductive layer 34b preferably should be of curved semi-spherical shape. The rest of the operation of the intrascope 1b using the television camera 16c is the same as was described above.

The housing box may be omitted in some cases and the television tube may be introduced into the intrascope without any housing and will be held then in position by the same means as were described above for holding the housing box.

In some cases the part to be examined is too small or too curved to accommodate even the television camera 16. For example the introduction of the intrascope 1a through narrow passages may be in some cases accomplished because of separate two-step insertion of the tube 16a and 16b, but their subsequent assembling together inside of the intrascope proves to be impossible because of the lack of sufficient space at the junction site. In such cases, it may be necessary to keep the tubes 16a and 16b apart from each other and to use an optical system 15c to focus the scanning illumination produced by the tube 16a on the photoemissive electrode 33 in the tube 16b, as shown in intrascope 1c, illustrated in Fig. 3.

The definition of the flying light spot produced in the screen 31 may be considerably improved by depositing said screen 31 on a supporting mesh screen 82 which was described above, instead of on the wall of the tube 16. Further improvement of definition of reproduced images may be achieved by making fluorescent screen 31 of grainless phosphors.

My device may also be used, instead of reproducing images, for transmitting signals from the interior of the examined part, which signals represents desired information.

In some cases the optical system 15c may be housed in the compartment 14b. In other cases it may be placed preferably in compartment 14a. It must be added that the use of the optical system 15c makes it necessary to increase the output of light from the fluorescent screen 31, as only 2% of the light will now reach the photoemissive electrode 33. The rest of the operation of the intrascope 1c is the same as was described above for the intrascope 1 or 1a.

This arrangement will be useful in locations which are known in advance as not to cause any bending of the intrascope in the area between said tubes 16a and 16b. It may be also of value in the examination of parts where the degree of such angulation between the tubes 16a and 16b is known in advance so that it may be overcome by the choice of a suitable optical system.

In order to reduce pin-cushion distortion inherent in electrostatic deflection system used in cameras described above and illustrated in Figs. 1 to 3, I make the fluorescent screen of a semi-spherical shape. Furthermore, the photoemissive electrode 33 may be preferably also shaped semi-spherically to reduce further pin-cushion effects. In addition, the photocathode 34 of the pick-up tube may also preferably have a curved semi-spherical shape which will help to overcome further distortion due to electrostatic focusing field 23. The use in combination of a curved fluorescent screen 31 and of a curved photocathode 34 represents an important improvement of my camera over devices of the prior art.

In case extremely bright images have to be investigated, the photocathode 34 of the pick-up tubes described above may be provided with a layer of phosphor on the side facing said image, which converts the radiation of strong intensity into a fluorescence or phosphorescence of weak intensity, so that the pick-up tube will not be damaged by excessive illumination. Such phosphors are well known in the art, therefore it is believed that their description is not necessary.

In some cases it is preferable to reduce further the rigid part of the intrascope by providing the source of image forming radiation outside of the intrascope. This embodiment of my invention is shown in Fig. 5.

The photocathode of the pick-up tube may be also made to provide a panoramic view of the examined part. The photocathode in this modification is extending in a curved semi-spherical manner to the side walls of the pick-up tube, as shown in Fig. 5. One window 12a in this modification is preferably situated at the end of the intrascope.

A modification of my photoconductive intrascope is shown in Fig. 4. The intrascope 1d has a source of illumination 5 described above. The photoconductive novel television camera 16d consists of the tube 16a which was described above and of a photocell 4. The tube 16a has an electron gun 28 producing a fine electron beam 29. The electron beam is scanning the fluorescent screen 31 disposed on the other end of the tube in a regular television raster. This scaning deflection of electron beam is provided by electrostatic plates 30a and 30b energized by saw-tooth waves from generators outside of examined part. On the face of the tube 16a there is deposited a photoconductive cell 4. The image of the examined part is projected on said cell 4 by the optical system 15. The photoconductive cell 4 consists of a conducting layer 34a transparent to the image forming radiation, of photoconductive layer 34b which changes its resistance in response to said image forming radiation, of the second photoconductive layer 34b' which is sensitive to radiation produced by the tube 16a and the second conductive layer 34a' transparent to radiation produced by said tube 16a. The photoconductive layers and light transparent conductive layers may be the same as described above. The layers 34a and 34a' are connected to the source of electrical power such as battery 9a. As long as photoconductive layers 34b and 34b' are not subject to irradiation, their resistance is such that current from battery 9a cannot pass through the photoconductive cell 4. If however layers 34b and 34b' are irradiated their resistance decreases so that the current can flow now through the cell. As the flow of current from the battery 9a is modulated by image of examined part, the successive electrical signals produced by battery and cell can be converted over a suitable resistor into video signals. Video signals after reduction of their noise by clipping or discriminating circuits and after amplification may be converted into images for examination. Photocell 4 in some cases may have its own compartment and may be separated from the tube 16a instead of being deposited on the wall of said tube 16a. In such event optical system may be preferably added to focus the flying spot illumination from the tube 16a on said photocell 4 as shown in Fig. 4a.

In some cases a very thin conducting layer $34a_2$ may be preferably interposed between said two photoconductive layers 34b and 34b' and serves as a connection to provide electrical bias for said photoconductive layers which will increase their photosensitivity. In some cases this conducting layer $34a_2$ should be nontransparent to image forming radiation as well as to scanning illumination from the tube 16a.

In some cases instead of two photoconductive layers 34b and 34b', one photoconductive layer sensitive both to image forming radiation and to scanning illumination may be used also. Further miniaturization of the photoconductive intrascope having two or one photoconductive layers and improvement of definition at the same time may be obtained in a modification of the television camera shown in Fig. 4b.

In this embodiment of my invention only one novel pick-up tube 16f is used. The pick-up tube 16f has a photoconductive photocathode 34d which consists of a layer 34a transparent to image forming radiation, photoconductive layer 34b and a light transparent conducting layer 34a'. In a close spacing from the photocathode 34d, such as not exceeding 0.25 millimeter but preferably much smaller, there is disposed a fluorescent screen 34e. The screen 34e may be supported by an electron transparent supporting layer such as of aluminum or may be supported by a mesh screen 82 as was described above. The fluorescent screen 34e may be in some cases provided with an electron transparent light reflecting conducting layer 34f on the side facing the electron gun 28. In some cases photocell 4 may be used instead of photocathode 34d.

Figure 4C:
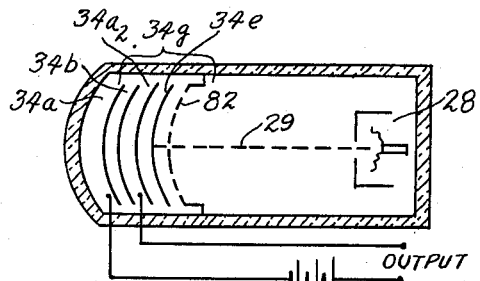

In some cases, said fluorescent layer 34e and backing layer 34f may be deposited on the photoconductive layer 34b, as shown in Fig. 4c. In such event a light transparent separating conducting layer $34a_2$ which does not poison fluorescent layer 34e may be preferably interposed between said photoconductive 34b and fluorescent 34e layers. "Nesa," cadmium oxides, tin oxides are suitable for this purpose. At the other end of the tube there is disposed an electron gun 28 which produces an electron beam 29 for scaning said fluorescent layer 34e in television raster. The image of the examined part is projected on said composite photocathode 34g and produces a "conductivity" image in the layer 34b, which has the pattern of said projected image. The scanning electron beam produces scanning light spot in the fluorescent layer 34e. The light spot scans the adjacent photoconductive layer 34b. The impingement of the light spot causes changes in conductivity, so that the current from battery 9a can flow through the circuit. These signals produced by the scanning light spot can be converted over a suitable resistor into video signals in the manner well known in the television art. In order to preserve sharpness of the scanning light spot said separating layer 34a' or $34a_2$ must not exceed 0.25 millimeter in thickness. The layer 34a' and $34a_2$ may be made of glass, mica, plastics coated with the material known as "Nesa" manufactured by Pittsburgh Plate Glass Company. It may be also made of tin salts such as halides or oxides, cadmium salts, indium compounds or metal powders such as of silver, platinum or gold. It is obvious that the composite photocathode 34g may be deposited on the wall of the vacuum tube or may be held by supporting means within the vacuum tube independently of the end walls of said tube. Such supporting means may be either in the form of mesh screen or of a continuous element which both were described above. The fluorescent layer 34e must be of phosphors having a very short persistence such as of the order of 1 microsecond, which were described above. The electron transparent layer 34f serves to improve efficiency of the light output from the fluorescent layer 34e and may be of aluminum. In some cases it may be preferably omitted.

The transparent conducting layer 34a causes a considerable loss of incident image forming radiation. In some applications when the sensitivity of the intrascope is of critical importance, the embodiment of my invention shown in Fig. 4d will be preferable. In this modification the free uncovered surface of the photoconductive layer 34b is facing the image forming radiation. On the opposite side of said layer 34b there is deposited the fluorescent light transparent conducting layer $34a_2$ and next the fluorescent layer 34e. All aforesaid layers are supported by the mesh screen 82 as was described above. The electrical field across the layer 34b is provided by the source of electrical power 9a connected to the conducting coating on the walls of the vacuum tube and to the conducting layer $34a_2$. The rest of the operation of the novel pick-up tube 16g is the same as was described above.

Figure 4E:
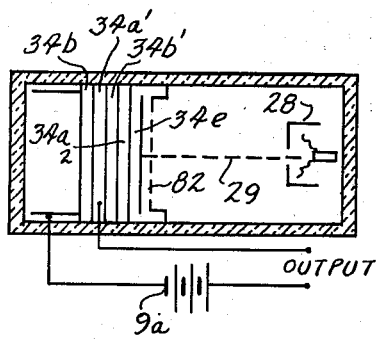
Figure 4D:
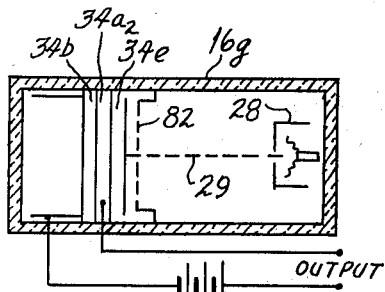

It is evident that the same principle of having the photoconductive layer 34b uncovered on the side facing the image forming radiation may be applied also to the construction in which two photoconductive layers 34b and 34b' are used. This modification is shown in Fig. 4e. It is evident that this principle can be used in all embodiments of my invention in which the photoconductive layer 34b is within a vacuum tube.

The fluorescent screen 34e if made of a curved semi-spherical shape will help to reduce pin-cushion distortion inherent in electrostatic deflection system. In addition, the photoconductive layer 34b may also preferably have a curved semi-spherical shape which will help to overcome further distortion due to electrostatic scanning. The use in combination of a curved fluorescent screen and of a curved photosensitive layer represents an important improvement of my camera, which is shown in Fig. 4b.

The intrascopes illustrated in Figs. 4, 4a, 4b, 4c, 4d and 4e may also be simplified by providing the source of image forming radiation outside of the intrascope as was explained above.

In case a true color image of the examined part is wanted, a rotating color wheel 50, drum, or truncated cone, composed of plural, e. g., three primary chromatic filters 51, 52 and 53 is placed before the television pick-up tube 16b, see Fig. 6. A similar wheel 50a rotating synchronously with the first color wheel 50 is placed in front of the picture tube 37 in the receiver. Each examined field is scanned and reproduced in succession through a different primary color in the filter wheel. Therefore three colored images, red, green and blue are projected on the final viewing screen 56 in 1/40 second. The persistence of vision lasts longer than 1/40 of a second therefore these three color images fuse in the mind of the observer and a multi-colored reproduction 57 corresponding to the true colors of the examined part results. The color wheels 50 and 50a are driven by induction motor located outside of the examined part, synchronized by synchronization stage which compares the incoming pulses with locally generated ones and thereby controls the speed and the phase of the disc. Since the color wheels synchronization is obtained from the video wave form, the phasing of the color filters is automatically selected, that is a given color automatically appears before the receiver tube when that color is present before the pick-up tube, as it is well known in television art.

The illuminating system 5 in this modification of the intrascope is the same as described above and shown in Fig. 1. The mounting of the illuminating system also may be the same as shown in Fig. 1. The optical system 15 is essentially the same as described above and shown in Fig. 1. In some cases additional lenses may be used between the rotating wheel 50 and the television pick-up tube 16b, or any other pick-up tube described above for a better focusing of the image of the examined part on the photocathode of the pick-up tube. The mounting of the optical system may be the same as shown in Fig. 1. The rotating color wheel 50 in front of the television pick-up tube has three sections of colored glass corresponding to three basic chromatic values such as red 51, blue 52 and green 53, and may be mounted on the bracket 59. The rotating wheel is activated by the synchronous motor situated outside of the examined part and connected to the wheel by means of the flexible insulated cable.

The image of the examined part is projected by the optical system onto the photocathode of the television pick-up tube through the rotating multicolor wheel 50 and is converted by said television pick-up tube into video signals having the pattern of the examined part in the same way as was explained above. The video signals are transmitted by the flexible coaxial cable to the amplifiers outside of the examined part. The amplified video signals are conducted by the coaxial cable to the viewing tube 37 of the kinescope type. The video signals modulate the scanning beam 60 of the kinescope 37. The modulated scanning beam in the kinescope striking the fluorescent screen 61 of the kinescope is reproducing the images of the examined part. These images are projected through the color wheel 50a rotating synchronously with the similar color wheel 50 in front of the pick-up tube. In this way three colored images of the examined part are projected on the final screen 56 in 1/40 of a second, blending thereby into one muti-colored image due to persistence of the vision of the observer. The resulting multi-colored images 57 can be visually examined on the screen 56 or may be recorded. It is obvious that with all intrascopes described above this color system may be used.

In some cases the use of the rotating color disc, drum or truncated cone may be not convenient, and a system using a stationary color filter may be preferable. It is obvious that the rotating color disc may be replaced by stationary color filters such as dichroic mirrors, but in such case two or three pick-up tubes must be provided in the intrascope. It is to be understood that all such color television systems come also within the scope of my invention. In order to use a stationary color filter with one pick-up tube only it is necessary to split the image by suitable optical means into plural, e. g., two or three images and to project said split images through the stationary color filter on separate areas of the photocathode. This embodiment of my invention is shown in Fig. 7. The image 64 of the examined part is projected by lens 65 between two mirrors 66 and 67. The mirrors are parallel to each other and equidistant from the optical axis. The mirrors produce from the original image 64 multiple secondary images such as 64a, 64b, 64c, etc. The lens 65a projects the image 64 and the secondary images 64a and 64b on the different areas A, B and C of the photocathode 68 of the pick-up tube, which may be of any type described above. There are many optical systems for splitting the image of the examined part into plural symmetrical images, which are well known in the art, see U. S. Patents Nos. 2,389,646 and 2,465,652, and it is to be understood that the description of the optical system used in my intrascope should be considered only in an illustrative and not in a limiting way.

Each photocathode 68 has a signal plate 69, and photoconductive or photovoltaic layer 71, which was described above. Three symmetrical images are projected on different areas A, B and C of the photocathode without overlapping each other. The stationary color filter having plural elements such as the red one 67, the green one 67a and the blue one 67b are provided either outside of the pick-up tube in cooperative relation with said three different areas A, B and C of the photocathode for receiving the original image 64 and symmetrical images 64a and 64b. The filters may also be positioned inside of the pick-up tube in front of the photocathode. Therefore the image 64a which passes through the red filter 67 will produce in the area A image 64a' having "red" information. The image 64 which passes through the green filter 67a will produce in the area B image 64' which provides "green" information, and the image 64b produced by the filter 67b will form in area C image 64b' which provides "blue" information. The scanning electron beam 33a produced by the flying spot light, as explained above, scans these images on the photocathode and produces video signals having the pattern of said "red," "green" and blue" images. When the area A of the photocathode is scanned video signals are produced which after amplification and improvement of their contrast are fed into "red" kinescope. Next the electron beam 33a scans the area B and image 64' and converts said image into video signals. These video signals correspond to the "green" image 64' and are fed into "green" kinescope. In the same way the video signals corresponding to the "blue" image 64b' are fed into the "blue" kinescope. It is obvious that instead of multiple kinescopes a single tricolor kinescope may be used as well. It is also evident that the scanning of the images on the photocathode does not have to proceed systematically from the area A to area B but may be also completely iterlaced. The basic feature of all these arrangements is that video signals derived from the scanning of the area A of the photocathode have to be fed into "red" channel, the signals produced by scanning area B of the photocathode have to be fed into "green" channel and signals from area C should be fed into "blue" channel.

It is obvious that there are many systems which can produce plural non-overlapping images and it is to be understood that all such systems come within the scope of this invention. It is also obvious that optical means or filters may be used to split not the whole image simultaneously into plural symmetrical images but to split each line of the image into three non-overlapping line images. These line images may be projected through multi-color filter to produce non-overlapping color line images. Each of said lines will be then scanned and converted into "red," "blue" and "green" video signals as was explained above.

The television camera of the type shown in Figs. 4 to 4e can be also used in this novel color television intrascope. Fig. 7a shows the use of the pick-up tube 16i for producing color images. It is obvious that the same system may be used with other pick-up tubes described above. The novel pick-up tube 16i has a photocathode 76 which consists of a light transparent conducting layer 76a and of photoconductive or photovoltaic layer 76b. The above mentioned layers may be of the materials described above. The photocathode 76 may be divided into plural areas such as three independent from each other photocathodes, as was shown in Fig. 7. This may be accomplished also by the insulating means which extend from the conducting layer 76a into photoconductive layer 76b. In another modification instead of this plural photocathode, three independent photocathodes may be deposited on the walls of the pick-up tube or may be mounted in the inside of said pick-up tube in such a manner that the edges of said photocathodes do not come in contact with each other. In the preferred form of this system, the optical projection of split images is of such a manner that said images do not overlap each other on the photocathode but fall in three separate areas A, B and C. In such case, only the signal plate 76a has to be divided into three different areas such as 76A, 76B and 76C which are insulated from each other or are non-contiguous to each other. In order to be able to transmit "red" video signals only to the "red" channel, "green" video signals only to the "green" channel and "blue" video signals only to the "blue" channel in this modification the photoconductive layer 76b does not have to be split any more into independent non-contiguous units. By the use of one of the optical systems described above, the image of the examined part is split into three separate images which are projected on three separate areas 76A, 76B and 76C. Each of the conducting signal plates of said photocathodes is connected to its own color channel only. In this way the signals from the signal plate 76A will be, for example, directed to the "red" kinescope, the signals from the signal plate 76B to the "green" kinescope and signals from the signal plate 76C will be fed into the "blue" kinescope.

Another way to produce color images is to subject various areas A, B and C of the photocathode or the scanning beam 33a to modulation by signals of different frequencies provided from an outside generator, different when scanning areas A, B or C and by making each primary color channel responsive only to one frequency which is made arbitrarily representative of said primary color. In this way, the "red," "green" and "blue" images will be fed into "red," "green" and blue" channels respectively by means of appropriate filters or decoders. This arrangement allows the use of one signal plate instead of three signal plates in the systems described above.

In some cases for reproducing color images instead of separate signal plates, a circuit having keying amplifiers may be used as well. This circuit activates amplifiers for video signals in a predetermined time sequence, so that the signals coming from the area A and representing "red" signals are amplified by amplifiers, whereas signals from the "green" area A and "blue" area C are not amplified and therefore are not reproduced. Next when the "green" area B is scanned the amplifiers receiving "green" signals are activated by said keying circuits, whereas amplifiers for "red" and "blue" signals are kept inactive. The keying amplifiers are well known in the art. It is believed, therefore, that their detailed description would only serve to complicate drawings. In some cases, equalizing circuits should be provided in addition in order to equalize differences in signals caused by different exposure time of the area A, B and C to the image forming radiation.

It is to be understood that all systems described above for producing color images may be used in combination with all pick-up devices described above for producing black and white images.

My invention is not limited to visible light images. It is evident that my intrascope may be made responsive to invisible images on either side of visible spectrum by using appropriate photo-sensitive layer in the photocathode of the television camera. It is to be understood also that my intrascope may serve for receiving images formed not only by various electro-magnetic radiations, such as gamma rays, ultra-violet, infra-red, etc., but also by particles radiation such as neutrons, alpha particles, protons, electrons or by ions. In such case, the photocathode of the pick-up tube described above may be provided with an atomic particle sensitive phosphor on the side facing said image or may have a special electron or other atomic particles emissive photocathode. Such photocathodes have been described in my U. S. Patents Nos. 2,525,832, 2,555,423 and 2,603,757.

Fig. 8 shows a pick-up tube 16j having atomic particles sensitive photocathode which is responsive to an atomic particles image and emits secondary atomic particles having the pattern of said image. It is to be understood that the photocathode 77 is shown only for illustration as there are many types of photocathodes sensitive to atomic particles, as evidenced by my above mentioned patents. The target 78 is scanned by a slow electron beam 33a from the electrode 33 in the manner described above. The electrons of the scanning beam 33a are deposited on the dielectric layer 79 of the target and are stored there. At the time of impingement of the beam of gamma rays or of atomic particles from the photocathode 77, the dielectric layer 79 becomes conductive. The electrons of the scanning beam 33a can now pass through the dielectric layer 79 to the signal plate 80 and produce video signals. In some cases, the photocathode 77 may be in apposition with the target 78.

The above described type of pick-up tube may also operate by using a fast scanning electron beam instead of by a slow beam. This modification is preferable in cases in which the particles emitted by the photocathode 77 have small velocity, for example, in case of a photoemissive cathode. In such case, the signal plate 80 should be on the side of the target 79 which faces the scanning electrode 33. The rest of the operation of this intrascope may be the same as described above.

The storage target may be also of the composite type and may consist of a fluorescent light reflecting layer 81, a fluorescent layer 81a, a light transparent conducting layer $34a_2$, and a photoconductive layer 33b, as shown in Fig. 8a. In some cases, the photocathode 77 and the composite storage target 83 may be in apposition to each other, which means contiguous to each other. In some applications the storage target 83 may be also used instead of the photocathode 77 and will serve to receive an image of invisible radiation and to convert said image into an electrical image. Also the target 78 may in some cases serve as a photocathode, see Fig. 8b.

Furthermore, my intrascope may serve for investigating images produced by supersonic radiation. In such case, the photocathode of the pick-up tubes described above is replaced by the supersonic sensitive photocathode, for example, of the type described in my co-pending applications, Serial No. 288,229, filed on May 16, 1952, and Serial No. 286,521, filed on May 7, 1952. This intrascope must have at its distal end a membrane and also must contain a medium to transmit supersonic vibrations to the pick-up tube. Instead of a membrane, the end-wall of the pick-up tube may form the end of the intrascope and will then receive supersonic image directly.

When using an invisible radiation for producing an image of the examined part, the color reproduction of said image may be also obtained, as it is explained in my U. S. Patent No. 2,593,925. Another system for color reproduction of invisible radiation images is to make separate sub-photocathodes A, B and C as described above, selectively sensitive to different groups of frequencies present in said invisible radiation image. For example, sub-photocathode A may be made to receive radiation only of wave length 3–4000 A. either by means of a special selective filter in front of said sub-photocathode or by making the photo-sensitive surface selectively responsive only to said wave-length. In the same manner, the sub-photocathode B will receive only radiations of wave-length 2,000–3,000 A. whereas the sub-photocathode C may be made sensitive only to radiation of 1000–2000 A. It is obvious that the wave lengths quoted above should be considered only in an illustrative and not in a limiting sense. In the same manner, radiation on the far end of the spectrum may be arbitrarily divided in various groups of frequencies. By assigning arbitrarily three color channels such as "red," "blue" and "green" to said three sub-photocathodes, a multi-color reproduction of an invisible image may be obtained. Also, the rotating color disc or drum which is provided instead of visible color filters with filters selective for various frequencies present in the invisible image may be used for the same purpose. This modification will then allow the use of only one photocathode instead of three sub-photocathodes.

It is to be understood that the above described systems for reproducing color images of the examined part may be used in combination with all pick-up devices described above for producing black and white images.

In many cases, it is preferable to have the source of invisible light or of other image forming radiation used for examination independent of my intrascope and outside of the intrascope. In such arrangement, the source of image forming radiation may be introduced prior to or subsequent to introduction of the intrascope into the examined part. This embodiment of my invention will facilitate the insertion of the intrascope as it will reduce the size of its rigid parts.

It is evident that all intrascopes used for receiving images or signals of ionizing radiations such as gamma rays, electrons, neutrons, protons, etc. may serve to reproduce images without having any optical system. In such case, the window 12a of the intrascope is preferably situated at the distal end of the intrascope as shown in Figs. 5, 5a or 8.

The novel television cameras described above both for invisible and invisible image forming radiation operate by means of the photoconductive or photovoltaic effect or by means of bombardment induced conductivity effect. It should be understood however that similar television cameras which may use a photoemissive effect instead of a photoconductive effect come also within the scope of my invention.

All the intrascopes described above may be further reduced in size by omitting the encasing and holding member 26, as shown in Fig. 5a. In this modification of my invention, the television pick-up tube may be of any of the types described above. The television pick-up tube may be inserted into the examined part by means of a flexible or semi-flexible pushing guide 15a, according to the type of the examined object. The television camera 16e is placed in a housing compartment 92 which is provided at its proximal end with extensions 94 for receiving the head of the guide 15a. At the other end of the housing compartment an extension is provided for the optical system 93. In some cases a semi-flexible transparent tip or a tip 90 having window 91 therein may be provided at the end of the housing 92. In some cases additional windows with lenses may be preferably added in the side walls of the housing box 92. In such event the photocathode of the pick-up tube 16e should be preferably of a panoramic type, as was shown in Fig. 5.

The intrascopes of the type described above may be further simplified by omitting the housing box 92 and introducing television pick-up tube into the examined part without any protective compartment. In such case an extension or a socket are provided at the proximal end of the television camera to accommodate the head of the guide 15a. Another extension is provided at the distal end of the television pick-up tube to support the optical system 93.

In this modification of my intrascope the head of the pushing guide 15a may be fitted into extension on the proximal end of the camera tube in the same manner as was described above for fitting the guide into extensions in the housing compartment. The pushing guide may be also screwed onto the socket at the proximal end of the pick-up tube. Also electromagnetic coils described above may be preferably used in this modification of my invention to secure a good contact.

In some applications it may be desirable to remove the guide 15a from the camera tube after its insertion. In such a case the camera is provided with the threads 89 described above to pull out said tube after examination is concluded.

In some applications the pick-up tube may be encased in an inflatable transparent sheath which is inflated after the insertion of intrascope.

It is evident that in all intrascopes illustrated above, a photovoltaic photo-cell may be used in some cases instead of the photoconductive photo-cell described above. The photovoltaic cell has the same construction as the photoconductive cell 4 except for omission of the electrical bias supplied by battery 9a which is not necessary in this modification. It is to be understood that the photovoltaic layers may be used in all modifications of the intrascope having the photoconductive layer.

It is obvious that all these simplified intrascopes described above may also be used for producing color images of the examined part in the manner described above. It is also to be understood that these simplified intrascopes may be used in combination with a source of an invisible radiation either of corpuscular or of undulant type. Furthermore, it is to be understood that the simplified intrascope may use pick-up devices based on photoemissive effect instead of photoconductive or photovoltaic effect described above.

My device may be also used, instead of for reproducing images, for transmitting signals from the interior of the examiner part, which signals represent desired information.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. A device for exploring a small curved passage comprising in combination a housing having a flexible portion conforming to the curvature of said passage, image sensitive means for receiving the image of the explored part and converting said image into an electrical pattern, separate means for producing a scanning illumination, said device furthermore comprising a member for maintaining said image sensitive means and said scanning illumination means in a fixed spatial relationship to each other when transmitting the image, one of the aforesaid means being removable from said housing independently of the other, and a member operable through said housing and connected to one of the aforesaid means to withdraw one of said means from said housing independently of the other means while said housing is still in said explored passage.

2. A device as defined in claim 1, in which said means producing a scanning illumination is a vacuum tube.

3. A device as defined in claim 1, in which said means producing illumination comprise a vacuum tube and said illumination is projected on said image sensitive means.

4. A device as defined in claim 1, in which said image sensitive means and said means producing illumination are spaced apart from each other.

5. A device as defined in claim 1, in which said image sensitive means comprise luminescent means and photoelectric means.

6. A device as defined in claim 1, in which said image sensitive means have a curved shape.

7. A device for exploring a small curved passage comprising in combination a housing having a flexible portion conforming to the curvature of said passage, image sensitive means for receiving the image of the explored part and converting said image into an electrical pattern, separate means for producing a scanning illumination, said device furthermore comprising a member for releasably securing and maintaining said image sensitive means and said scanning illumination means in a fixed spatial relationship to each other when transmitting the image, a member for mounting the aforesaid means in said housing successively and independently from each other, whereby said image sensitive means and said scanning illumination means may be assembled in said housing in cooperative relationship to each other after the introduction of said housing into said explored passage, and a member operable through said housing and connected to one of aforesaid means to withdraw one of said means from said housing independently of the other means while said housing is still in said passage.

8. A device as defined in claim 7, in which said means for producing a scanning illumination comprise a vacuum tube.

9. A device as defined in claim 8, in which said image sensitive means comprise a vacuum tube.

References Cited in the file of this patent

UNITED STATES PATENTS

| | | |
|---|---|---|
| Re. 22,450 | Smith | Feb. 29, 1944 |
| 2,150,160 | Gray | Mar. 14, 1939 |
| 2,150,168 | Ives | Mar. 14, 1939 |
| 2,256,300 | Van Mierlo | Sept. 16, 1941 |
| 2,378,746 | Beers | June 19, 1945 |
| 2,420,198 | Rosenthal | May 6, 1947 |
| 2,433,971 | Adams | Jan. 6, 1948 |
| 2,516,069 | Newhouse | July 18, 1950 |
| 2,764,148 | Sheldon | Sept. 25, 1956 |
| 2,764,149 | Sheldon | Sept. 25, 1956 |
| 2,788,390 | Sheldon | Apr. 9, 1957 |